United States Patent
Sakamoto

[11] Patent Number: 5,812,044
[45] Date of Patent: Sep. 22, 1998

[54] ELECTROMAGNETIC CLUTCH

[75] Inventor: Yuki Sakamoto, Isesaki, Japan

[73] Assignee: Sanden Corporation, Gunma, Japan

[21] Appl. No.: 848,182

[22] Filed: Apr. 29, 1997

[30] Foreign Application Priority Data

May 7, 1996 [JP] Japan ...................... 8-112233

[51] Int. Cl.$^6$ .............. F16D 27/04; H01F 7/20; H01F 15/10
[52] U.S. Cl. .............. 335/299; 335/289; 335/296; 336/107; 336/192; 192/84.1; 192/84.96
[58] Field of Search .................... 335/285–299; 336/107, 192; 192/84.1, 84.961

[56] References Cited

U.S. PATENT DOCUMENTS

| | | | |
|---|---|---|---|
| 3,585,450 | 6/1971 | Lane | 336/192 |
| 4,181,393 | 1/1980 | Lill | 339/98 |
| 4,419,536 | 12/1983 | Doyle et al. | 174/52 R |
| 4,429,358 | 1/1984 | Miyagi | 363/68 |
| 4,432,446 | 2/1984 | Okano et al. | 192/84 C |
| 4,503,413 | 3/1985 | Stalzer | 336/192 |
| 4,557,544 | 12/1985 | Esser | 339/97 R |
| 4,623,754 | 11/1986 | Kikuchi et al. | 174/52 R |
| 4,935,713 | 6/1990 | Bekheet | 335/296 |
| 5,138,293 | 8/1992 | Ishimaru | 335/289 |
| 5,225,801 | 7/1993 | Ida et al. | 336/96 |
| 5,307,038 | 4/1994 | Ishimaru | 335/296 |
| 5,320,206 | 6/1994 | Maejima | 192/84 C |
| 5,508,671 | 4/1996 | Takashi | 335/296 |

FOREIGN PATENT DOCUMENTS

| | | |
|---|---|---|
| 0422962 | 4/1991 | European Pat. Off. . |
| 2726400 | 10/1995 | France . |
| 3816965 | 11/1989 | Germany . |
| 56-138529 | 10/1981 | Japan . |
| 2106007 | 4/1990 | Japan . |
| 2253014 | 11/1990 | Japan . |
| 8247171 | 9/1996 | Japan . |

*Primary Examiner*—Michael L. Gellner
*Assistant Examiner*—Raymond Barrera
*Attorney, Agent, or Firm*—Baker & Botts, L.L.P.

[57] ABSTRACT

The present invention is directed to an electromagnetic clutch including a U-shaped annular magnetic housing and a coil disposed within the annular magnetic housing. A connector connects a pair of end portions of the coil to a pair of covered lead wired connected to an external electric circuit having an electric power source. A pair of channel-shaped terminals are provided at one end of the pair of the covered lead wires, respectively. The connector includes a box member comprising a first groove, a second groove, a pair of third grooves, and a pair of fourth grooves formed at an inner bottom surface thereof The first and second grooves are arranged to intersect with the third and fourth grooves in right angles. A pair of end portions of the coil are stably laid on an inner bottom surface of the first groove and a pair of lead wires oppositely extending from a diode are stably laid on an inner bottom surface of the second groove. The pair of terminals are received within the pair of third and fourth grooves, respectively, while the pair of end portions of the coil and the pair of the lead wires of the diode are forcibly received within a pair of the slits of the pair of terminals, respectively.

22 Claims, 14 Drawing Sheets

ELECTROMAGNETIC CLUTCH

BACKGROUND OF THE INVENTION

1. Field of the Invention

This invention generally relates to an electromagnetic clutch, and more particularly, to a connector associated with a component of the electromagnetic clutch.

2. Description of the Related Art

Electromagnetic clutches are well known in the prior art and are often used for controlling the transfer of power from an automobile engine to the refrigerant compressor of an automobile air conditioning system. One such electromagnetic clutch is disclosed in Japanese Patent Application Publication No. 2-253014 ("JP'014").

The overall construction of the electromagnetic clutch disclosed in the JP'014 is shown in FIG. 1. With reference to FIG. 1, a clutch assembly 10 is disposed on the outer peripheral portion of annular tubular extension 11, which projects from an end surface of a compressor housing (not shown) to surround drive shaft 20. Drive shaft 20 is rotatably supported in the compressor housing (not shown) by a bearing (not shown). The clutch assembly 10 includes rotor 30 rotatably mounted on tubular extension 11 by bearing 12.

Rotor 30 has a U-shaped configuration in its cross-sectional view and includes outer cylindrical portion 31, inner cylindrical portion 32, and axial end plate portion 33. End plate portion 33 connects the outer and inner cylindrical portions 31 and 32 at one axial end. Pulley 34 is fixedly mounted about the outer cylindrical portion 31 of rotor 30. Pulley 34 is coupled to the automobile engine (not shown) with a belt (not shown).

Hub 40, which extends beyond tubular extension 11, is fixed to the outer terminal end of drive shaft 20 by bolt 41. An annular armature plate 50 is movably connected to hub 40 through a plurality of leaf springs 60. Leaf springs 60 permit axial movement of armature plate 50 toward the end plate portion 33 of rotor 30. One end of each of leaf springs 60 is fixed to armature plate 50 by rivet 51, and the other end is fixed to hub 40 by rivet 52. Armature plate 50 faces the end plate portion 33 of rotor 30 with a predetermined, axial air gap "G" therebetween.

Electromagnet 70 includes a yoke 71 having a U-shaped configuration in its cross-sectional view, so that an annular hollow space 711 is defined therewithin, and an electromagnetic coil 72 disposed within the annular hollow space 711 of yoke 71. Coil 72 is prepared by winding a single conducting wire multiple times, so that coil 72 has a first end portion 72a and a second end portion 72b opposite to first end portion 72a. The single conducting wire of the coil 72 is coated with a thin layer of an insulating material. Yoke 71 is concentric with drive shaft 20, and is fixedly mounted on the compressor housing (not shown) through an annular attaching plate 73. Yoke 71 is disposed within an annular hollow portion 35 of rotor 30, such that Yoke 71 is surrounded by an air gap. When coil 72 of electromagnet 70 is energized, armature plate 50 is attracted to the end plate portion 33 of rotor 30. Thus, drive shaft 20 rotates as rotor 30 is turned by the engine. If coil 72 of electromagnet 70 is not energized, armature plate 50 is separated from the end plate portion 33 of rotor 30 due to the recoil strength of leaf springs 60. Rotor 30 still rotates in response to the engine output, but drive shaft 20 does not turn.

Clutch assembly 10 further includes connector 80 for connecting the first and second end portions 72a and 72b of coil 72 to an external electric circuit (not shown) including a battery (not shown) installed in an automobile as an electric power source. Connector 80 is fixedly secured to yoke 71 through annular attaching plate 73.

Referring to FIG. 2, a construction of connector 80 is described below. Connector 80 includes a box member 81 having an open end and a separate cover member 82 (shown in FIG. 1) tightly covering the open end of box member 81. Box member 81 is a rectangular parallelepiped in shape and is constructed of insulating plastic. A pair of terminals 83 and 84, made of conductive material, are partially embedded within box member 81. The embedding of terminals 83 and 84 within box member 81 is done when box member 81 is molded. Terminals 83 and 84 are arranged to be parallel to each other. First slits 83a and a separate second slit 83b are formed at terminal 83 at a portion exposed to an inner hollow space 810 of box member 81. Similarly, first slits 84a and a separate second slit 84b are formed at terminal 84 at a portion exposed to the inner hollow space 810 of box member 81. As illustrated in FIG. 1, first and second end portions 72a and 72b of coil 72 penetrate an annular bottom portion 712 of yoke 71 and annular attaching plate 73 through a rubber-made bushing 74. First end portion 72a of coil 72, arranged to be parallel to terminal 83, is led into inner hollow space 810 of box member 81, and then is forcibly inserted into slit 83a of terminal 83 to be electrically connected to terminal 83. When first end portion 72a of coil 72 is forcibly inserted into slit 83a of terminal 83, the insulating material coated on an exterior surface of first end portion 72a of coil 72 is stripped away, so that a sufficient conductive area is exposed in order to establish an electrical connection with terminal 83. A manner similar to the manner described above is applied to a relationship between the second end portion 72b of coil 72 and slits 84a of terminal 84.

A surge voltage eliminating device 85 is provided in order to eliminate surge voltage (voltage that is generated immediately after the deenergization of coil 72 of electromagnet 70) and is disposed within inner hollow space 810 of box member 81. Device 85 includes diode 85a and a pair of lead wires 85b and 85c which are connected to diode 85a and extend in opposite directions from each other. Surge voltage eliminating device 85 is oriented, such that the pair of lead wires 85b and 85c are perpendicular to terminals 83 and 84. An end of lead wire 85b is forcibly inserted into slit 83b of terminal 83 to be electrically connected to terminal 83. Similarly, an end of lead wire 85c is forcibly inserted into slit 84b of terminal 84 to be electrically connected to terminal 84. Accordingly, diode 85a electrically bridges terminals 83 and 84 through the pair of lead wires 85b and 85c.

After completion of the forcible insertion of first and second end portions 72a and 72b of coil 72 and lead wires 85b and 85c into respective slits 83a and 84a and slits 83b and 84b, the open end of box member 81 is tightly closed by cover member 82 constructed of insulating plastic, through a packing ring 86 of elastic material (shown in FIG. 1), which may be rubber.

One end of terminal 83 which is opposite to slits 83a extrudes from box member 81. Similarly, one end of terminal 84 which is opposite to slits 84a extrudes from box member 81. Both terminals 83 and 84 have one end that is embedded in a casing 87, which is integral to box member 81. Casing 87 is connected to a female casing (not shown), such that one end of both terminals 83 and 84 are connected to a pair of plugs (not shown), which are connected to the external electric circuit (not shown), respectively.

Another electromagnetic clutch shown in FIGS. 3–5 is also well known in the prior art. Further, in FIGS. 3–5, the same numerals are used to denote the corresponding elements shown in FIG. 1 of JP'014.

As illustrated in FIG. 3, one of first and second end portions 72a and 72b of coil 72, for example, first end portion 72a, is connected to one end of a first covered lead wire 91 by a well known manner, for example, crimping. In this crimping process, one end of the first covered lead wire 91 is uncovered. Next, a connecting section between first end portion 72a of coil 72 and one end of first covered lead wire 91 is tightly surrounded by a tubular member 911 of insulating plastic so as to prevent current leakage therefrom.

With reference to FIGS. 4 and 5, second end portion 72b of coil 72 and covered lead wire 91 are arranged to pass through a hole (not shown) formed through annular bottom portion 712 of yoke 71. Second end portion 72b of coil 72 and first covered lead wire 91 passes through yoke 71 and penetrate a first and second rubber-made bushing 75 and 76, which penetrate annular attaching plate 73, respectively. Second end portion 72b of coil 72 is grounded by connecting a terminal end of second end portion 72b to attaching plate 73 with screw 77.

A female plug (not shown) is connected to the other end of first covered lead wire 91 by a well known manner, for example, crimping. In this crimping process, the other end of first covered lead wire 91 is uncovered. A connecting section between the female plug (not shown) and the other end of first covered lead wire 91 is tightly surrounded by a tubular member 912 of insulating plastic so as to prevent current leakage therefrom. The female plug (not shown) provided at the other end of first covered lead wire 91 receives a first male plug 92a. First male plug 92a is connected to one end of a second covered lead wire 92 by a well known manner, for example, crimping. In this crimping process, one end of second covered lead wire 92 is uncovered. A connecting section between first male plug 92a and one end of second covered lead wire 92 is surrounded by a tubular member 92b of insulating plastic so as to prevent current leakage therefrom. A second male plug 92c is connected to the other end of second covered lead wire 92. Second male plug 92c is connected to a battery (not shown) which may be installed in an automobile as an electric power source, through a lead wire (not shown). Second male plug 92c is connected to the other end of a second covered lead wire 92 by a well known manner, for example, crimping. In this crimping process, the other end of second covered lead wire 92 is uncovered. A connecting section between second male plug 92c and the other end of second covered lead wire 92 is surrounded by a tubular member 92d of insulating plastic so as to prevent current leakage therefrom.

Surge voltage eliminating device 85 having diode 85a and the pair of lead wires 85b and 85c is provided between second covered lead wire 92 and a third covered lead wire 93. The terminal end of lead wire 85b is connected to one end of second covered lead wire 92 together with first male plug 92a. The terminal end of lead wire 85c is connected to one end of third covered lead wire 93 by a well known manner, for example, crimping, by use of a crimping terminal 94. In this crimping process, one end of third covered lead wire 93 is uncovered. Accordingly, diode 85a is bridged between one end of second lead wire 92 and one end of third lead wire 93 through the pair of lead wires 85b and 85c. The other end of third lead wire 93 is connected to a connecting terminal 95 by a well known manner, for example, crimping. In this crimping process, the other end of third covered lead wire 93 is uncovered. Connecting terminal 95 is prepared to be grounded by means of connecting terminal 95 to the compressor housing (not shown) by screw 95a.

A tube member 96 of insulating plastic surrounds second covered lead wire 92 and a part of a third covered lead wire 93, so that a connecting section between the terminal end of lead wire 85c and one end of third covered lead wire 93 prevents current leakage, and mechanical damage to diode 85a caused by an external force is prevented.

In JP'014, because the first and second and portions 72a and 72b of coil 72 and lead wires 85b and 85c are fine and tend to bend easily, a well-trained technician is required to forcibly insert first and second end portions 72a and 72b of coil 72 into slits 83a and 84a, respectively, and to forcibly insert lead wires 85b and 85c into slits 83b and 84b, respectively.

Further, because of the arrangement of first and second end portions 72a and 72b of coil 72, lead wires 85b and 85c and slits 83a, 84a, 83b and 84b, a complicated and discontinuous process is required to prepare terminals 83 and 84.

Moreover, because the wire of coil 72 is only coated with the thin layer of insulating material, a part of each of first and second end portions 72a and 72b of coil 72 between yoke 71 and connector 80 is exposed to the outside of electromagnetic clutch 10, as illustrated in FIG. 1. This part may be damaged by an external force and/or may be corroded by an external environment, or both.

With respect to FIGS. 3–5, because the ends of the covered lead wires are uncovered and then connected to the plugs and the terminals by crimping, the time required to manufacture electromagnetic clutch 10 is increased.

In addition, in a manufacturing process of the electromagnetic clutch 10, if thermosetting resin is used to fill an air gap created between electromagnetic coil 72 and yoke 71 in order to fixedly dispose electromagnetic coil 72 within annular hollow space 711 of yoke 71 and to prevent an undesirable intrusion of dust and water droplets into electromagnetic coil 72 in an additional step, a part of a cover member covering first lead wire 91 adjacent to first end portion 72a may deteriorate due to heat generated in the thermosetting process of the resin.

SUMMARY OF THE INVENTION

Accordingly, it is an object of the invention to provide an electromagnetic clutch having an improved connection associated with a component thereof.

An electromagnetic clutch according to the present invention includes an electromagnetic coil assembly which comprises an annular magnetic housing having a U-shaped cross-section and a coil disposed within an inner hollow space of the annular magnetic housing. A conductive element is connected to an external electric circuit which includes an electric power source. A connecting element conductively connects the conductive element with the coil.

The annular magnetic housing comprises a first annular side wall portion having an outer diameter, a second annular side wall portion having an inner diameter, which is greater than the outer diameter of the first annular side wall portion, and an annular bottom portion connecting the first and second annular side wall portions.

The coil comprises a wound single conductive wire, which is coated with a film of insulating material and includes a first end portion and a second end portion opposite to the first end portion.

The connecting element includes a box member having an open top end and a closed bottom end opposite to the open top end. The box member is secured to the annular bottom portion of the annular magnetic housing while the first and second end portions of the wound single conductive wire penetrate the annular bottom portion of the annular magnetic housing and the closed bottom end of said box member.

The conductive element includes a pair of covered lead wires and a pair of terminals fixedly connected to one end of the pair of the covered lead wires, respectively.

The box member includes a single first groove, a pair of second grooves and a pair of third grooves which are formed at an inner surface of the closed bottom end thereof The single first groove, the pair of the second grooves, and the pair of the third grooves are arranged such that the single first groove intersects both the pair of the second grooves and the pair of third grooves.

Each of the pair of terminals includes a flat top portion having opposite lateral ends, a pair of side portions which project downward from the opposite lateral ends of the flat top portion, respectively, and a pair of first slits formed at a projecting end of the pair of side portions of each of the terminals, respectively.

The first and second portions of the wound single conductive wire are arranged, such that a part of each of the first and second end portions thereof is set on an inner bottom surface of the first groove.

The pair of side portions of the pair of terminals are received within the pair of the second grooves and the pair of the third grooves, respectively, while a part of the first and second end portions of the wound single conductive wire laid on the inner bottom surface of the single first groove is forcibly received within the pair of first slits of the pair of terminals, respectively.

DETAILED DESCRIPTION OF PREFERRED EMBODIMENTS

Figure 1:
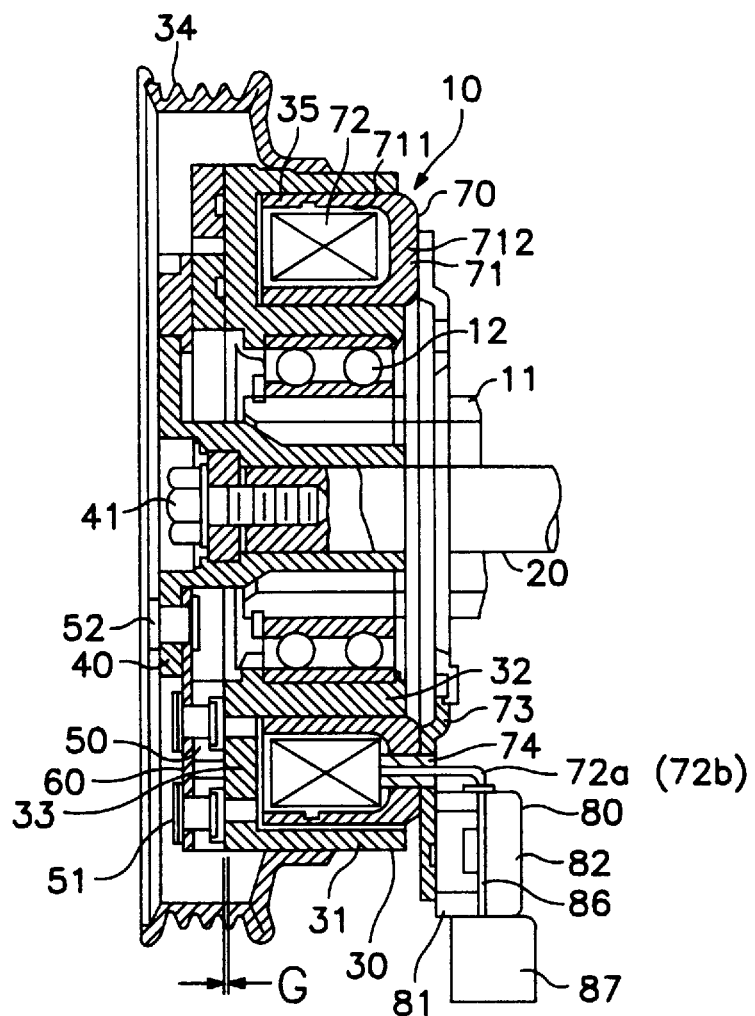
FIG. 1 is an overall vertical cross-sectional view of an electromagnetic clutch in accordance with JP'014.
Figure 2:
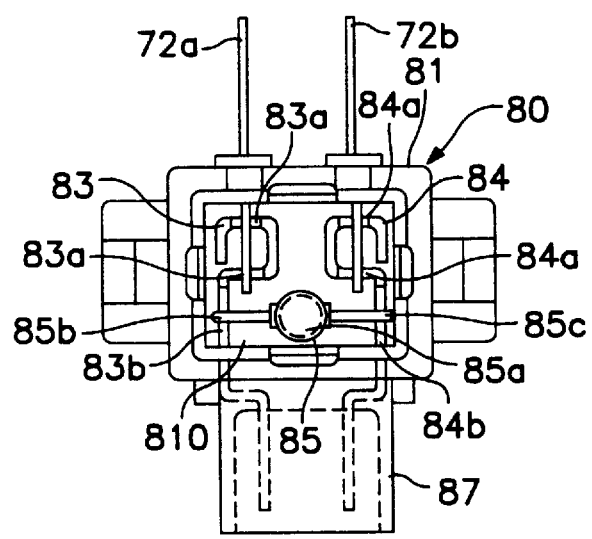
FIG. 2 is a plane view of a box member of a connector shown in FIG. 1.
Figure 3:
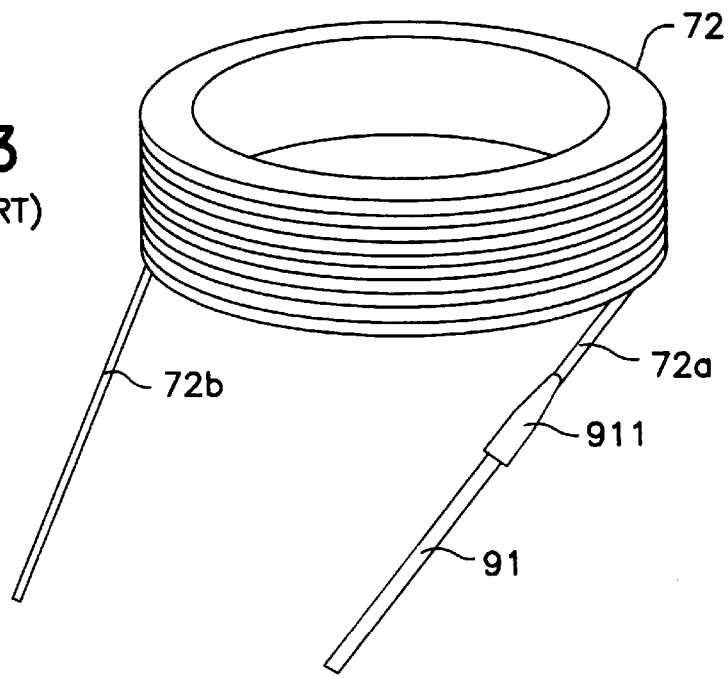
FIG. 3 is a perspective view of an electromagnetic coil of an electromagnet of an electromagnetic clutch in accordance with another prior art electromagnetic clutch.
Figure 4:
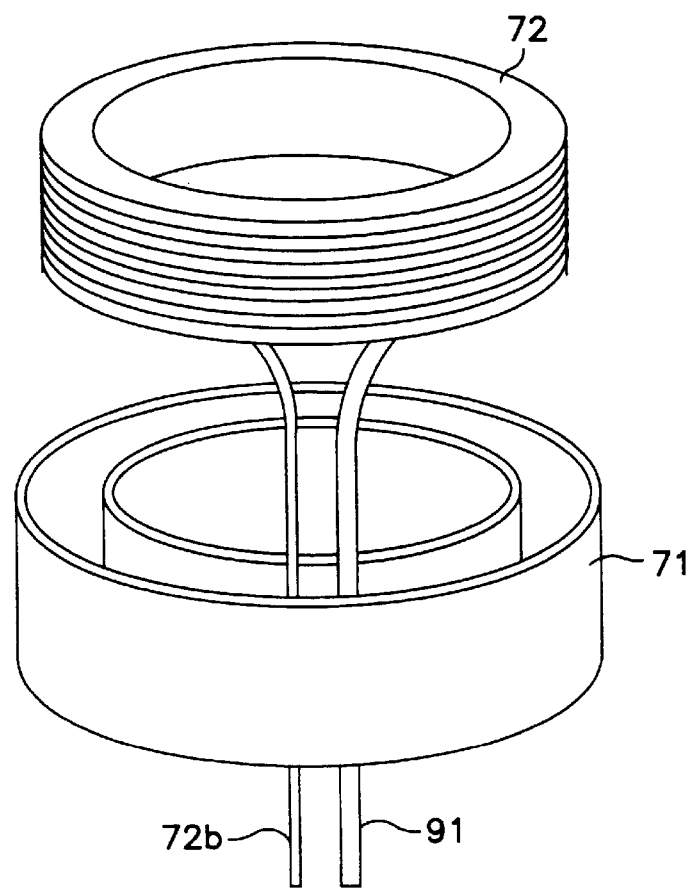
FIG. 4 is an exploded perspective view of the electromagnet of the electromagnetic clutch in accordance with another prior art electromagnetic clutch.
Figure 5:
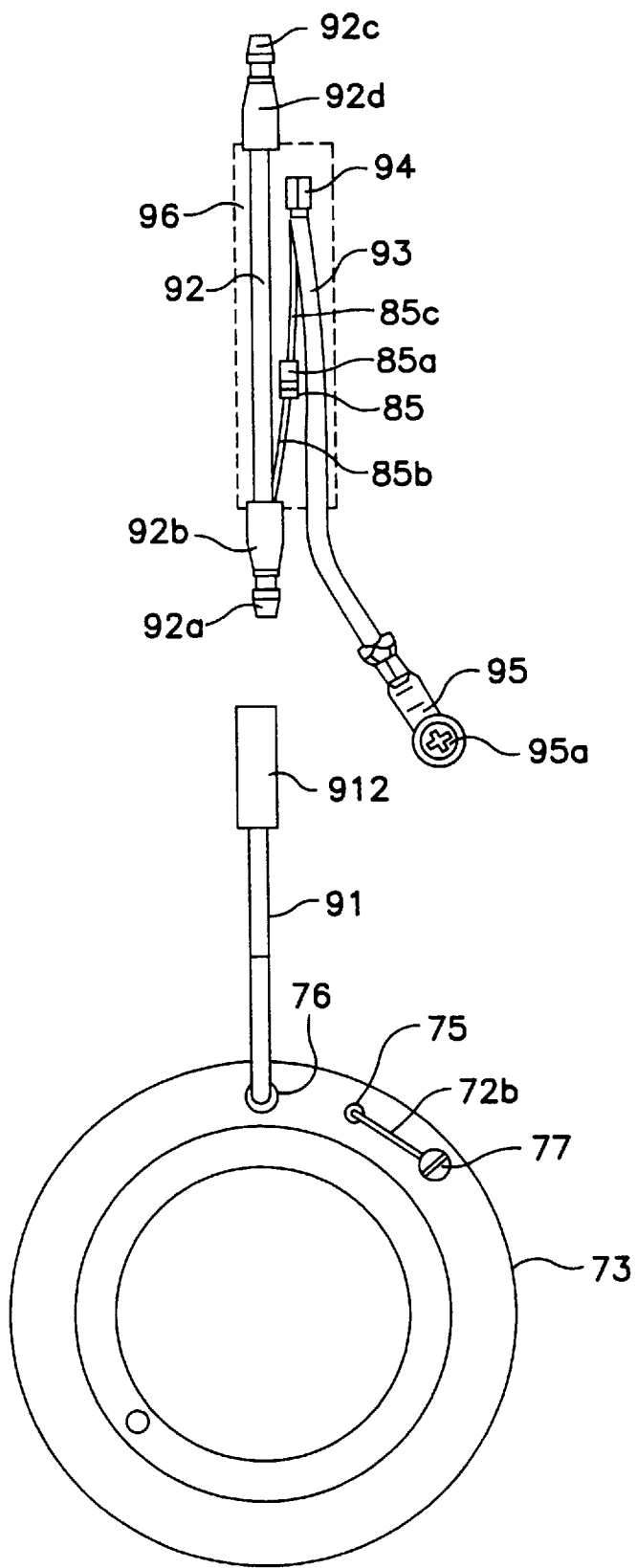
FIG. 5 is an exploded plane view of a connector of the electromagnetic clutch in accordance with another prior art electromagnetic clutch.
Figure 6:
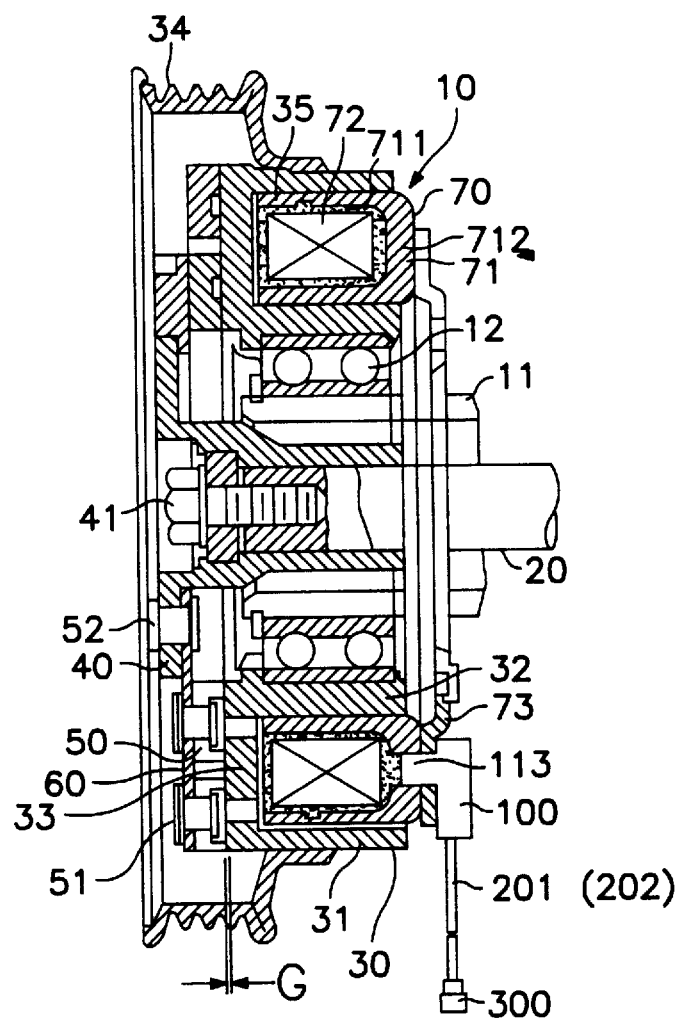
FIG. 6 is an overall vertical cross-sectional view of an electromagnetic clutch in accordance with one embodiment of the present invention.

The overall construction of an electromagnetic clutch in accordance with one embodiment of the present invention is shown in FIG. 6. In FIG. 6, the same numerals are used to denote the corresponding elements shown in FIG. 1 so a further explanation thereof is omitted.

Figure 7:
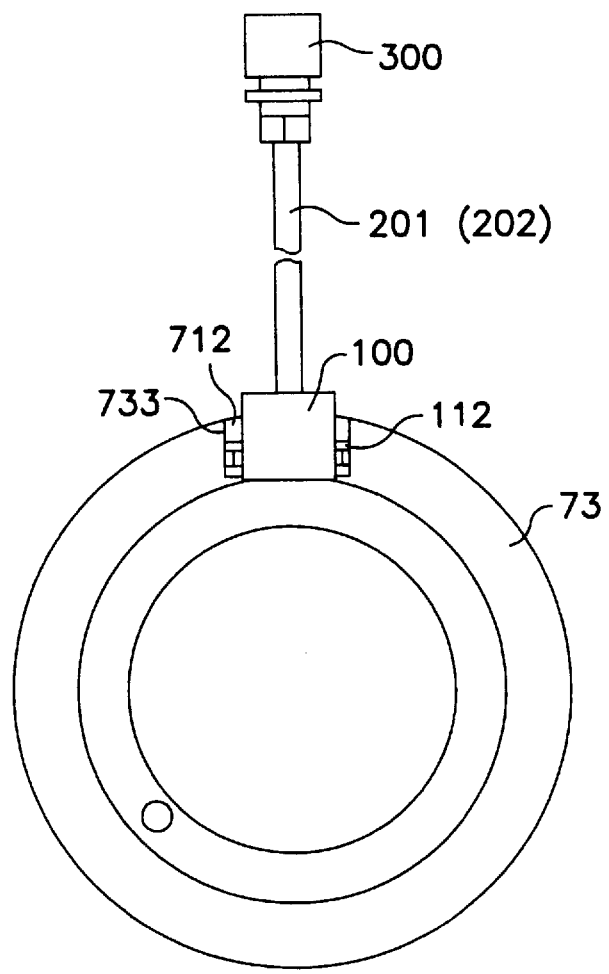
FIG. 7 is a plane view of the electromagnetic clutch shown in FIG. 6.

With reference to FIG. 6, clutch assembly 10 includes a connector 100 fixedly disposed on annular bottom portion 712 of yoke 71 of magnetic material. Connector 100 connects first and second end portion 72a and 72b (shown in FIG. 11) of coil 72 with one end of a pair of covered lead wires 201 and 202, respectively. As illustrated in FIG. 7, the other end of the pair of covered lead wires 201 and 202 are connected to a plug 300 by means of a well known manner, for example, crimping.

Figure 14:
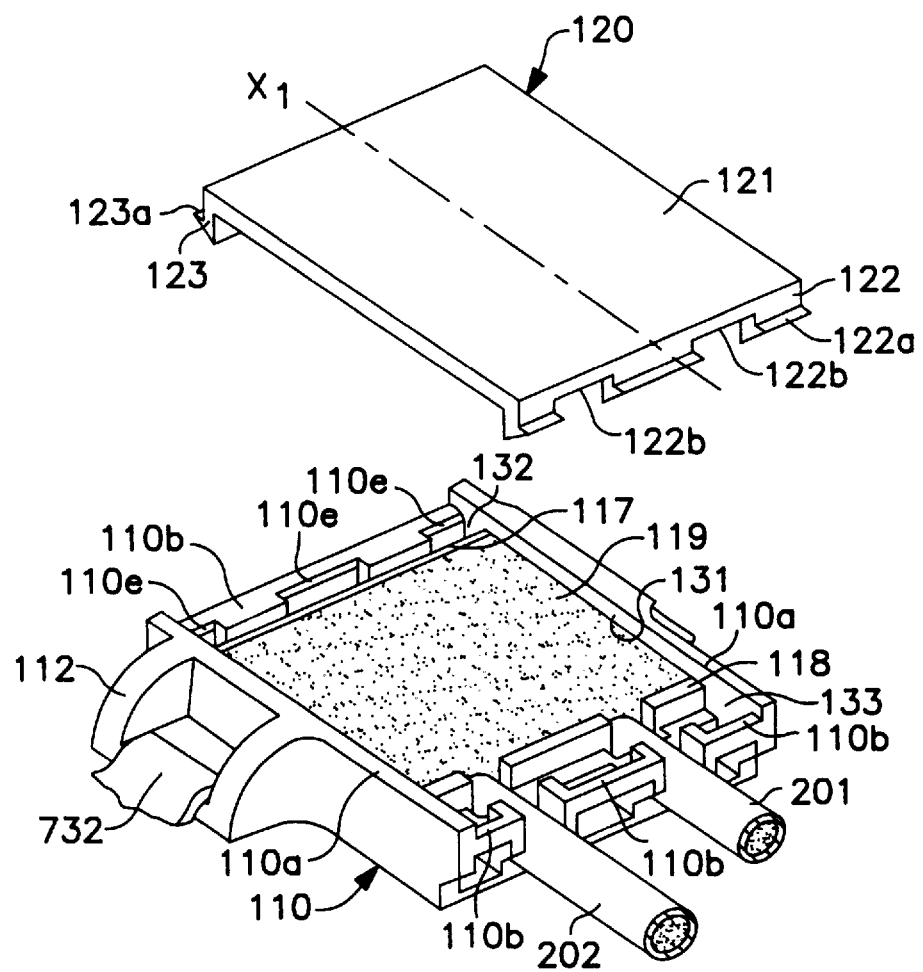
FIG. 14 is a perspective view of a connector shown in FIG. 6.

With reference to FIG. 14, connector 100 includes a box member 110 having an open end and a separate lid member 120 which covers the open end of box member 110. Both box member 110 and lid member 120 are made of an insulating material which may be, for example, a composite of glass fiber and 6—6 nylons.

Lid member 120 includes a flat plane portion 121 and a pair of side wall portions 122 and 123 which are bent downward at right angles at the opposite longitudinal ends of flat plane portion 121. A hooked portion 122a is formed at a terminal edge of side wall portion 122. A pair of rectangular cut-out portions 122b are formed at the terminal edge of side wall portions 122. The pair of rectangular cut-out portions 122b are arranged to be generally symmetric with each other with respect to the longitudinal axis $X_1$ of lid member 120. Similarly, a hooked portion 123a is formed at a terminal edge of side wall portions 123. A pair of rectangular cut-out portions (not shown) identical to the pair of rectangular cut-out portions 122b are formed at the terminal edge of side wall portion 123.

Figure 8:
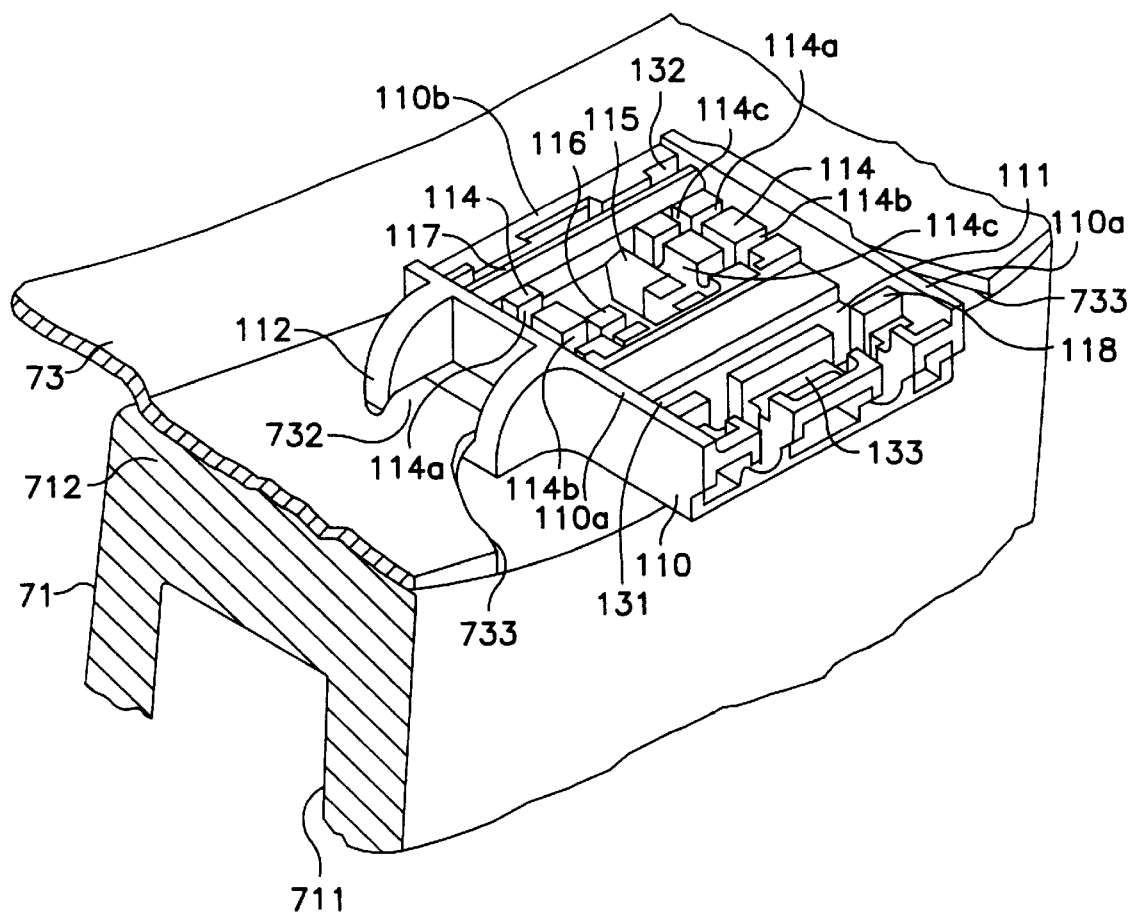
FIGS. 8–10 are perspective views of a part of the electromagnet shown in FIG. 6. In the drawings, a step in the of process of manufacturing the electromagnetic clutch shown in FIG. 6 is illustrated.
Figure 13A:
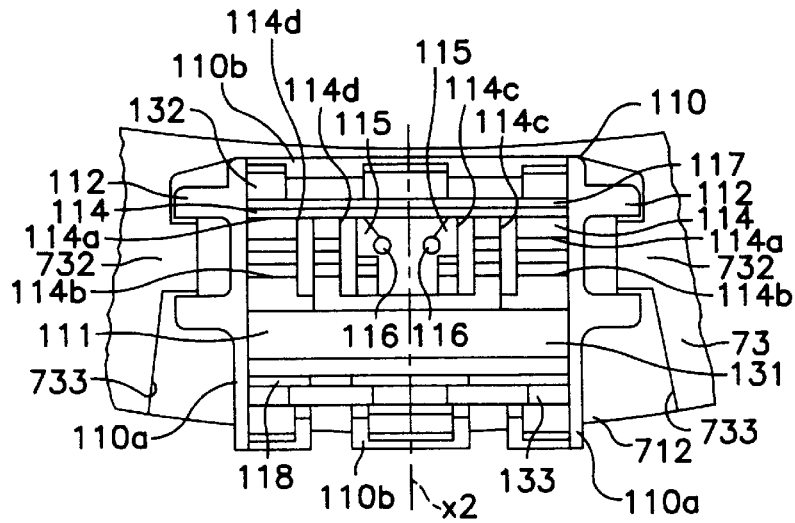
FIGS. 13a–13f are plane views of a part of the electromagnet shown in FIG. 6. In the drawings, a step in the process of manufacturing the electromagnetic clutch shown in FIG. 6. is illustrated.

With reference to FIGS. 8 and 13a, box member 110 is generally a rectangular parallelepiped in shape, and includes a pair of tabs 112 which extend outward from opposite lateral side walls 110a of box member 110. Pair of tabs 112 are prepared to be fixedly engaged with a pair of pegs 732, which are formed at one peripheral portion of the annular attaching plate 73, respectively.

Figure 15A:
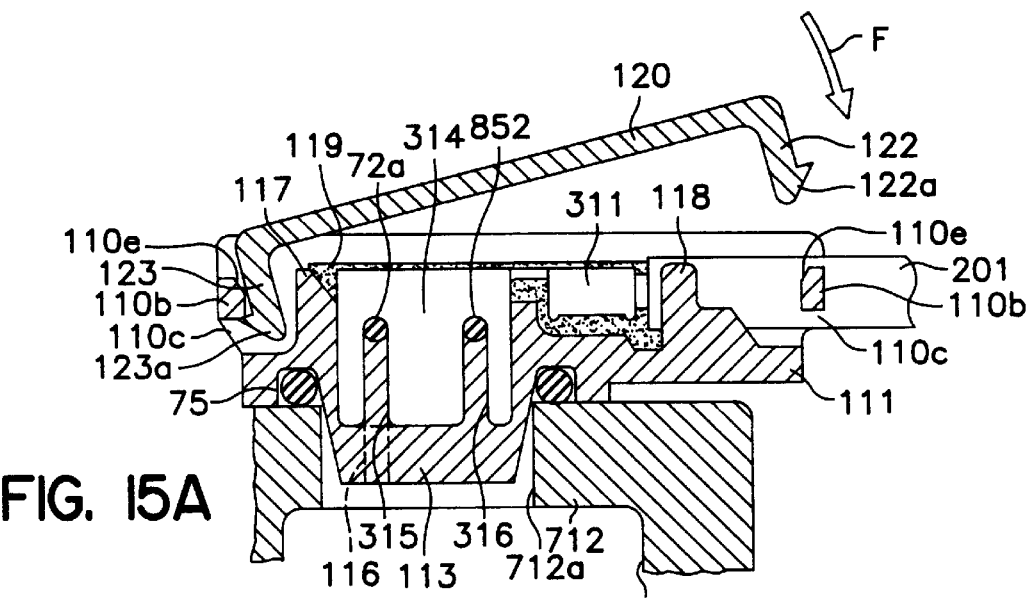
FIGS. 15a–15c are longitudinal cross sectional views of the connector shown in FIG. 6. In the drawings, a step in the process of assembling the connector is illustrated.
Figure 15B:
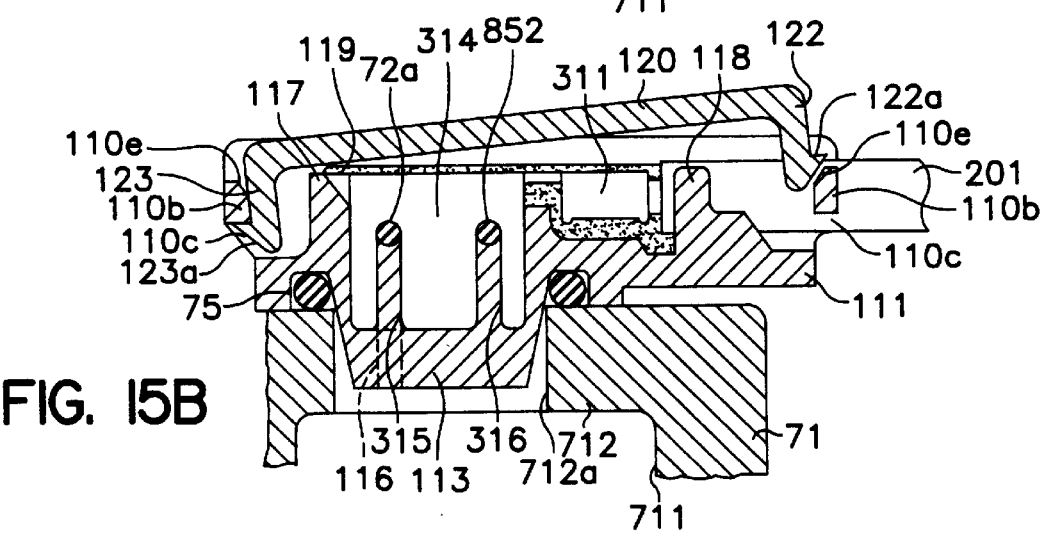
Figure 15C:
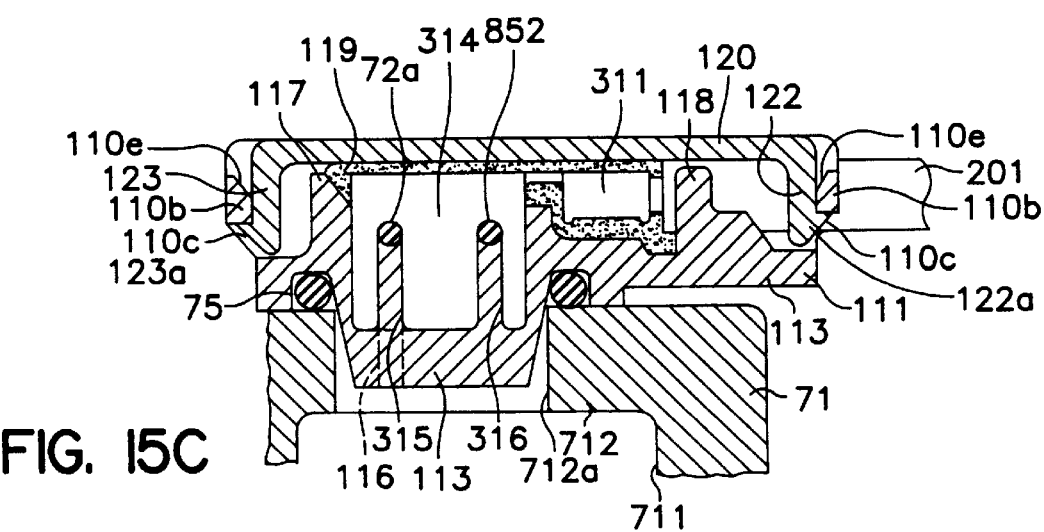

As preferably illustrated in FIGS. 15a–15c, box member 110 further includes a first projection 113 projecting from an outer surface of a bottom portion 111. First projection 113 is a generally a truncated pyramid in shape and is received within hole 712a, which is formed at one peripheral region of annular bottom portion 712 of yoke 71.

With reference to FIGS. 8 and 13a again, box member 110 further includes a pair of second projections 114 projecting from one half of the area (to the top in FIG. 13a) of an inner surface of bottom portion 111 of box member 110. Each of the pair of second projections 114 is generally a rectangular parallelepiped in shape and terminates at a position that is lower than an upper surface of lateral side walls 110a of box member 110. The pair of second projections 114 are arranged to be symmetrical to each other with respect to the longitudinal axis $X_2$ of box member 110 with a predetermined distance between them.

A pair of first grooves 114a are formed at a top end surface of the pair of second projections 114, respectively. The pair of first grooves 114a are arranged to be aligned with each other. A pair of second grooves 114b is formed at the top end surface of the pair of second projections 114, respectively. The pair of second grooves 114b are also arranged to be aligned with each other. First and second grooves 114a and 114b are arranged to be parallel to each other with a predetermined distance between them in the direction of the longitudinal axis $X_2$ of box member 110.

A pair of third grooves 114c is formed at the top end surface of one (to the right in FIG. 13a) of the pair of second projections 114. The pair of third grooves 114c are arranged to be parallel to each other with a predetermined distance between them. The pair of third grooves 114c are further arranged to be parallel to the longitudinal axis $X_2$ of box member 110.

A pair of fourth grooves 114d is formed at the top end surface of the other (to the left to FIG. 13a) of the pair of second projections 114. The pair of fourth grooves 114d are also arranged to be parallel to each other with a predetermined distance between them. The pair of third grooves 114d are also further arranged to be parallel to the longitudinal axis $X_2$ of box member 110.

Accordingly, first, second, third and fourth grooves 114a, 114b, 114c and 114d are arranged such that first and third grooves 114a and 114c intersect with each other at right angles. Second and fourth grooves 114b and 114d also intersect with each other at right angles, and third and fourth grooves 114c and 114d are parallel to each other.

A pair of curved regions 115 are formed at the inner surface of bottom portion 111 of box member 110 at a position adjacent to an inside of the pair of second projections 114. A pair of circular holes 116 are formed at bottom portion 111 of box member 110 at a position adjacent to an inside of the pair of curved regions 115.

A first partitioning wall 117 is formed at the inner surface of bottom portion 111 of box member 110. First partitioning wall 117 spans the opposite lateral side walls 110a of box member 110 and faces one of a pair of longitudinal side walls 110b (to the top in FIG. 13a) of box member 110 with a uniform spacing of a predetermined distance. A top end surface of first partitioning wall 117 is arranged to be lower than the upper surface of lateral side walls 110a of box member 110, but is higher than the top end surface of second projections 114.

A second partitioning wall 118 is also formed at the inner surface of bottom portion 111 of box member 110. Second partitioning wall 118 also spans opposite lateral side walls 110a of box member 110 and faces the other longitudinal side wall 110b (to the bottom in FIG. 13a) of box member 110 with a uniform spacing of a predetermined distance. A top end surface of second partitioning wall 118 is also arranged to be lower than the upper surface of lateral side walls 110a of box member 110, but is higher than the top end surface of second projections 114.

By providing first and second partitioning walls 117 and 118, a first, second and third chamber sections 131, 132, and 133 are defined within an inner hollow space of box member 110, between first and second partitioning walls 117 and 118, between first partitioning wall 117 and one of the pair of longitudinal side walls 110b (to the top in FIG. 13a), and between second partitioning wall 118 and other longitudinal side wall 110b (to the bottom in FIG. 13a), respectively.

A manner of connecting first and second end portion 72a and 72b (shown in FIG. 11) of coil 72 with the corresponding one end of the pair of covered lead wires 201 and 202 (shown in FIG. 7) with connector 100 is described in detail below.

In a first step, with reference to FIGS. 8 and 13a, box member 110 is received within a cut-out portion 733 formed at one peripheral region of annular attaching plate 73, while first projection 113 is received within hole 712a formed at one peripheral region of annular bottom portion 712 of yoke 71 as preferably illustrated in FIGS. 15a–15c. In this step, 0-ring seal element 75 is elastically disposed between annular bottom portion 712 of yoke 71 and bottom portion 111 of box member 110 at a position of the periphery of hole 712a of yoke 71.

Referring again to FIGS. 8 and 13a, in a second step, a pair of pegs 732 formed at one peripheral portion of annular attaching plate 73 is bent inwardly to be fixedly engaged with the pair of tabs 112 of box member 110, respectively. As a result, box member 110 is fixedly disposed on annular bottom portion 712 of yoke 71.

Figure 11:
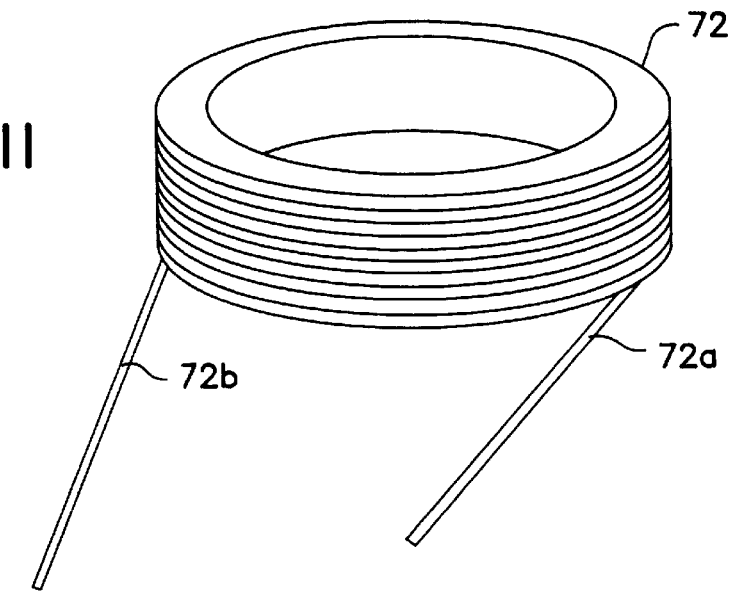
FIG. 11 is a perspective view of an electromagnetic coil of an electromagnet of the electromagnetic clutch shown in FIG. 6.
Figure 12:
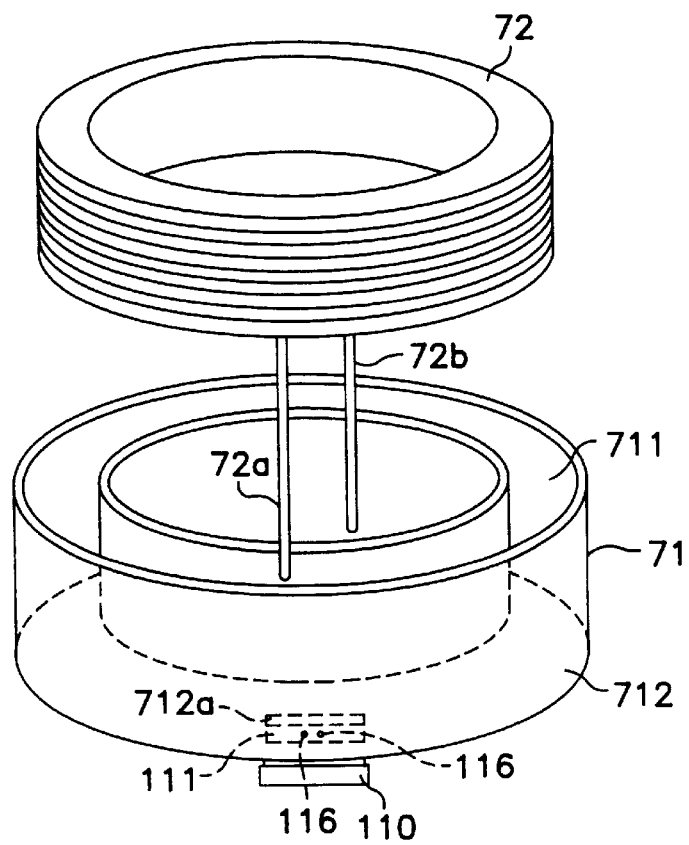
FIG. 12 is an exploded perspective view of the electromagnet of the electromagnetic clutch shown in FIG. 6.

In a third step, with reference to FIG. 12, electromagnetic coil 72 is received within annular hollow space 711 of yoke 71, while first and second end portions 72a and 72b of coil 72 pass through the corresponding circular holes 116 formed at bottom portion 111 of box member 110. Before performing this step, as illustrated in FIG. 11, first and second end portions 72a and 72b of coil 72 are straightened and arranged so that first end portion 72a is slightly longer than second portion 72b. By this arrangement, first and second end portions 72a and 72b of coil 72 may easily pass through the corresponding circular holes 116 formed at bottom portion 111 of box member 110.

Figure 9:
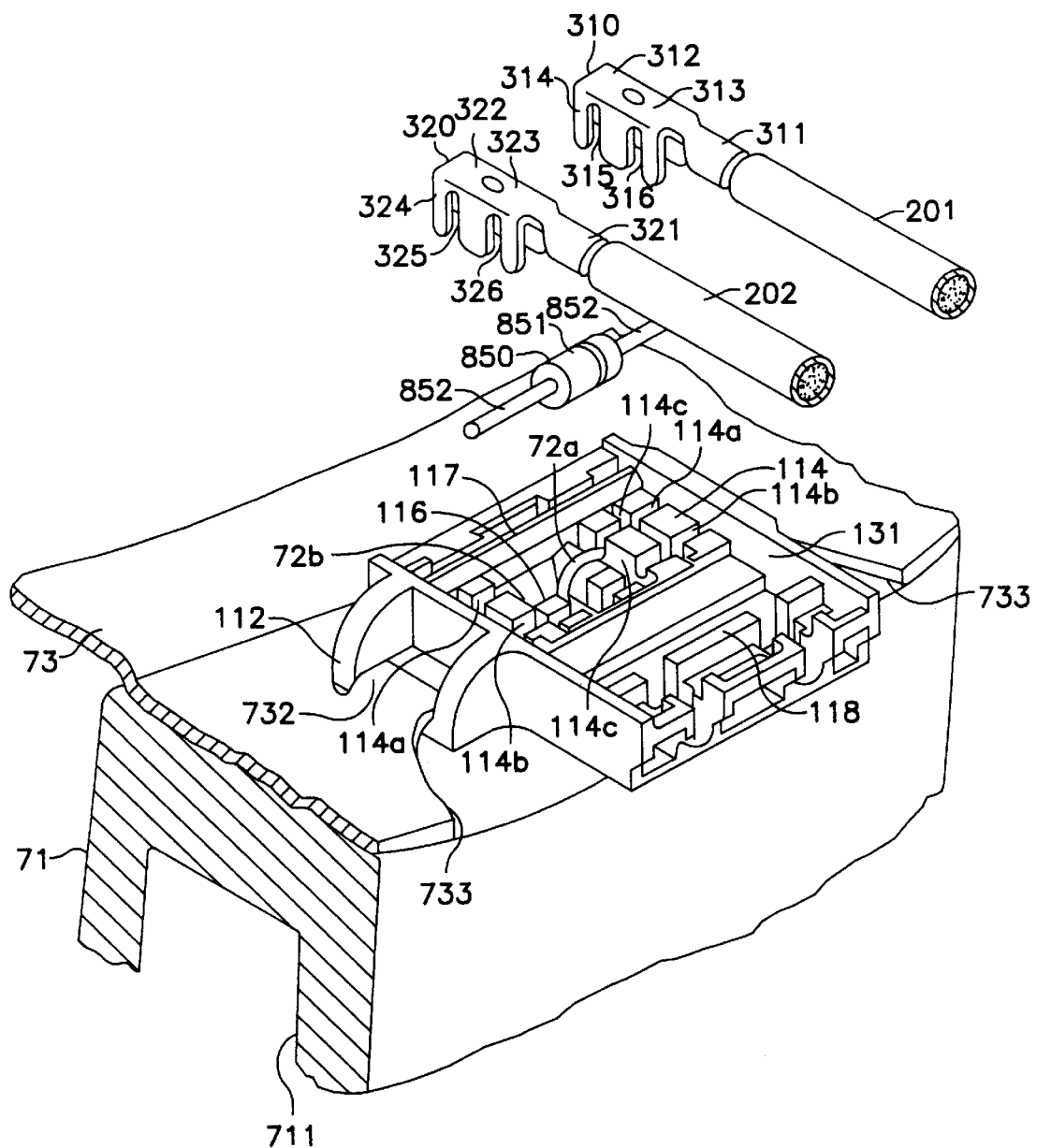
Figure 13B:
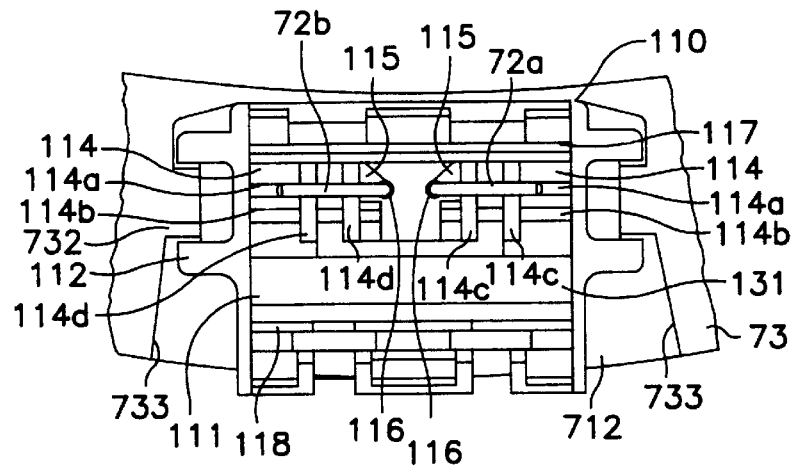

In a fourth step, with reference to FIGS. 9 and 13b, first and second end portions 72a and 72b of coil 72 that are passed through the corresponding circular holes 116 are trimmed to have a certain length, and then are bent in the opposite directions to each other to be loosely received within the pair of first grooves 114a, respectively. By this operation, a part of first and second end portions 72a and 72b of coil 72 are stably laid on an inner bottom surface of the pair of first grooves 114a, respectively. In addition, a part of first end portion 72a of coil 72 stably laid on the inner bottom surface of one of first grooves 114a (to the right in FIG. 13b) extends across the pair of third grooves 114c, and a part of second end portion 72b of coil 72 laid on the inner bottom surface of the other first groove 114a (to the left in FIG. 13b) extends across the pair of fourth grooves 114d as well.

Figure 13C:
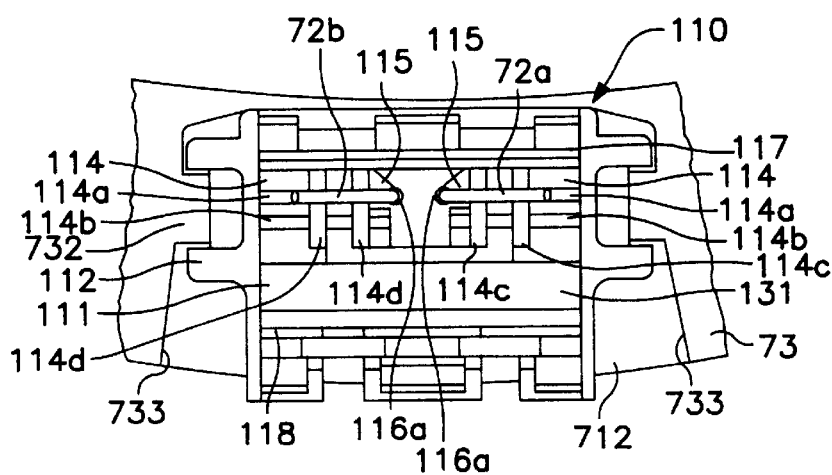

In a fifth step, with reference to FIG. 13c, air gaps related between first and second end portions 72a and 72b of coil 72 and corresponding circular holes 116 are filled with silicone 116a so as to block the communication between annular hollow spaces 711 of yoke 71 (shown in FIG. 12) with first chamber section 131 defined within the inner hollow space of box member 110.

In a sixth step, with reference to FIG. 6, an air gap created between electromagnetic coil 72 and yoke 71 is filled with thermosetting resin having electric insulating properties, for example, epoxy resin 701, so that electromagnetic coil 72 is entirely covered with epoxy resin 701. As a result, when epoxy resin 701 is set, electromagnetic coil 72 is fixedly disposed within annular hollow space 711 of yoke 71, and dust and water droplets are prevented from intruding into electromagnetic coil 72. Additionally, in this step, the yoke 71 is oriented such that annular bottom portion 712 of yoke 71 is parallel to a horizontal plane, so that yoke 71 is upwardly open. Further as a result of the blocking operation in the fifth step, an undesirable flow of epoxy resin 701 into first chamber section 131 defined within the inner hollow space of box member 110 may be prevented. Moreover, because 0-ring seal element 75 is elastically disposed between annular bottom portion 712 of yoke 71 and bottom portion 111 of box member 110 at the position of the periphery of hole 712a of yoke 71, an undesirable leak of epoxy resin 701 from annular hollow space 711 of yoke 71 to the outside of yoke 71 through hole 712a is prevented.

The above-mentioned first through sixth steps are successively carried out in one assembly line. The partially manufactured electromagnetic clutches 10 of the sixth step may be moved from the assembly line to a storing yard to be temporarily stored there, and epoxy resin 701 within annular hollow space 711 of yoke 71 is naturally cooled to the ambient temperature. The partially manufactured electromagnetic clutches 10, which are temporarily stored in the storing yard, are then moved to another separate assembly line for the completion of the seventh through tenth steps, which are described in detail below.

Figure 13D:
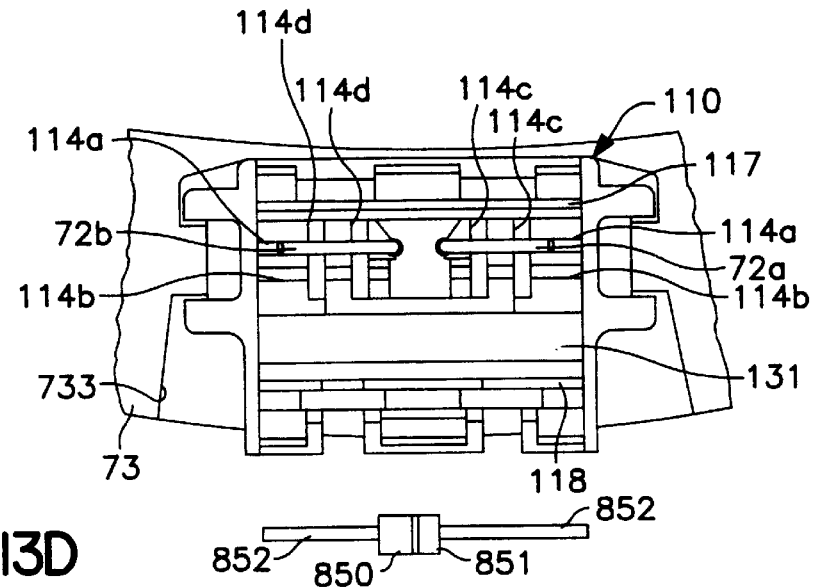
Figure 13E:
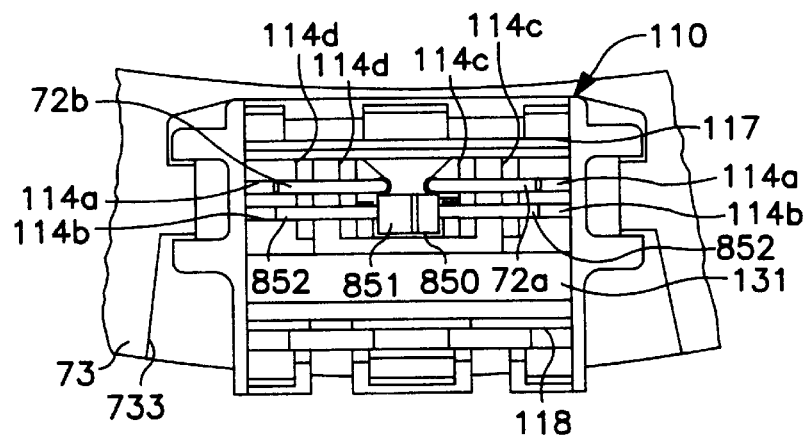

In a seventh step, with reference to FIGS. 9, 13d and 13e, a surge voltage eliminating device 850 is prepared. Surge voltage eliminating device 850 includes a diode 851 and a pair of lead wires 852 which are connected to diode 851 and extend in opposite directions of each other. Surge voltage eliminating device 850 is oriented, such that the pair of lead wires 852 are parallel to the pair of second grooves 114b. Then, the pair of lead wires 852 are loosely received within the pair of second grooves 114b, respectively. By this operation, the pair of lead wires 852 are stably laid on an inner bottom surface of the pair of second grooves 114b, respectively. In addition, a part of one of the pair of lead wires 852 stably laid on the inner bottom surface of one of second grooves 114b (to the right to FIG. 13e) extends across the pair of third grooves 114c, and a part of the other lead wire 852 stably laid on the inner bottom surface of the other second groove 114b (to the left in FIG. 13e) extends across the pair of fourth grooves 114d as well.

In an eighth step, with reference to FIG. 9, a pair of terminals 310 and 320 are prepared. The pair of terminals 310 and 320 are connected to one end of the pair of covered lead wires 201 and 202, respectively. The other end of the pair of covered lead wires 201 and 202 are connected to an electric circuit (not shown) which may include a battery (not shown) installed in an automobile as an electric power source.

Terminal 310 includes a ring portion 311 and a channel portion 312 which extends from one longitudinal end of ring portion 311. Channel portion 312 comprises a flat bottom region 313 and a pair of side wall regions 314 which extend from the opposite lateral ends of flat bottom region 313, respectively. The pair of side wall regions 314 are arranged to be parallel to each other with a predetermined spacing. The distance between the pair of side wall regions 314 is designed to be substantially equal to the distance between the pair of third grooves 114c. A pair of slits 315 and 316 are formed at each of side wall regions 314. Slits 315 and 316 extend in the lateral direction of side wall region 314 to substantially the entire depth of the channel portion 312. The pair of slits 315 and 316 are arranged to be parallel to each other with a predetermined spacing. Slits 315 formed at the pair of side wall regions 314 are arranged to be aligned with each other in the lateral direction of channel portion 312. Slits 316 formed at the pair of side wall regions 314 are arranged to be aligned with each other in the lateral direction of channel portion 312 as well. The distance between the pair of slits 315 and 316 is designed to be substantially equal to the distance between first groove 114a and second groove 114b. The width of slits 315 is designed to be slightly smaller than diameter of first end portion 72a of coil 72, and the width of slits 316 is designed to be slightly smaller than the diameter of lead wires 852 of surge voltage eliminating device 850.

Similarly, terminal 320 includes a ring portion 321 and a channel portion 322, which extends from one longitudinal end of ring portion 321. Channel portion 322 comprises a flat bottom region 323 and a pair of side wall regions 324 which extend from the opposite lateral ends of flat bottom region 323, respectfully. The pair of side wall regions 324 are arranged to be parallel to each other with a predetermined spacing. The distance between the pair of side wall regions 324 is designed to be substantially equal to the distance between the pair of fourth grooves 114d. A pair of slits 325 and 326 extend in the lateral direction of side wall region 324 to substantially the entire depth of channel portion 322. The pair of slits 325 and 326 are arranged to be parallel to each other with a predetermined spacing. Slits 325 formed at the pair of side wall regions 324 are arranged to be aligned with each other in the lateral direction of channel portion 322. Slits 326 formed at the pair of side wall regions 324 are arranged to be aligned with each other in the lateral direction of channel portion 322 as well. The distance between the pair of slits 325 and 326 is designed to be substantially equal to the distance between first groove 114a and second groove 114b. The width of slits 325 is designed to be slightly smaller than the diameter of second end portion 72b of coil 72, and the width of slits 326 is designed to be slightly smaller than the diameter of lead wires 852 of surge voltage eliminating device 850.

Ring portion 311 of terminal 310 and ring portion 321 of terminal 320 are fixedly connected to one end of covered lead wires 201 and 202, respectively, by a well known manner, for example, crimping. Further, one end of each of covered lead wires 201 and 202 is stripped before the above crimping process is carried out.

Moreover, each of terminals 310 and 320 is prepared from a plate member (not shown) via continuous processes of forming slits 315 (325) and 316 (326) and forming ring portion 311 (321) and channel portion 312 (322).

Terminal 310 provided at one end of covered lead wire 201 is oriented such that the pair of side wall regions 314 are aligned with the pair of third grooves 114c and slit 315 of each of the side wall regions 314 is aligned with first groove 114a, and slit 316 of each of side wall regions 314 is aligned with second groove 114b. Then, terminal 310 is moved downward such that the pair of side wall regions 314 are received within the corresponding third grooves 114c. When the pair of side wall regions 314 are fitly received within the corresponding third grooves 114c, a part of first end portion 72a of coil 72 stably laid on the inner bottom surface of one of first grooves 114a (to the right in FIG. 13f) is forcibly received within slit 315 of each of side wall regions 314. As a result, the insulating material, which may be, for example, enamel coated on an exterior surface of first end portion 72a of coil 72, is intentionally stripped therefrom in order to expose a sufficient conductive area to be electrically connected with terminal 310. Accordingly, a sufficient electrical connection between first end portion 72a of coil 72 and terminal 310 is established. Additionally, when the pair of side wall regions 314 are fitly received within the corresponding third groves 114c, a part of one of the pair of lead wires 852 stably laid on the inner bottom surface of one of second grooves 114b (to the right in FIG. 13f) is forcibly received within slit 316 of each of the side wall regions 314. As a result, a sufficient electrical connection between one of the pair of lead wires 852 and terminal 310 is established.

In addition, a manner of electrically engaging terminal 320 with second end portion 72b of the coil 72 and the other lead wire 852 of surge voltage eliminating device 850 is substantially similar to that described above, so a further explanation thereof is omitted.

Figure 10:
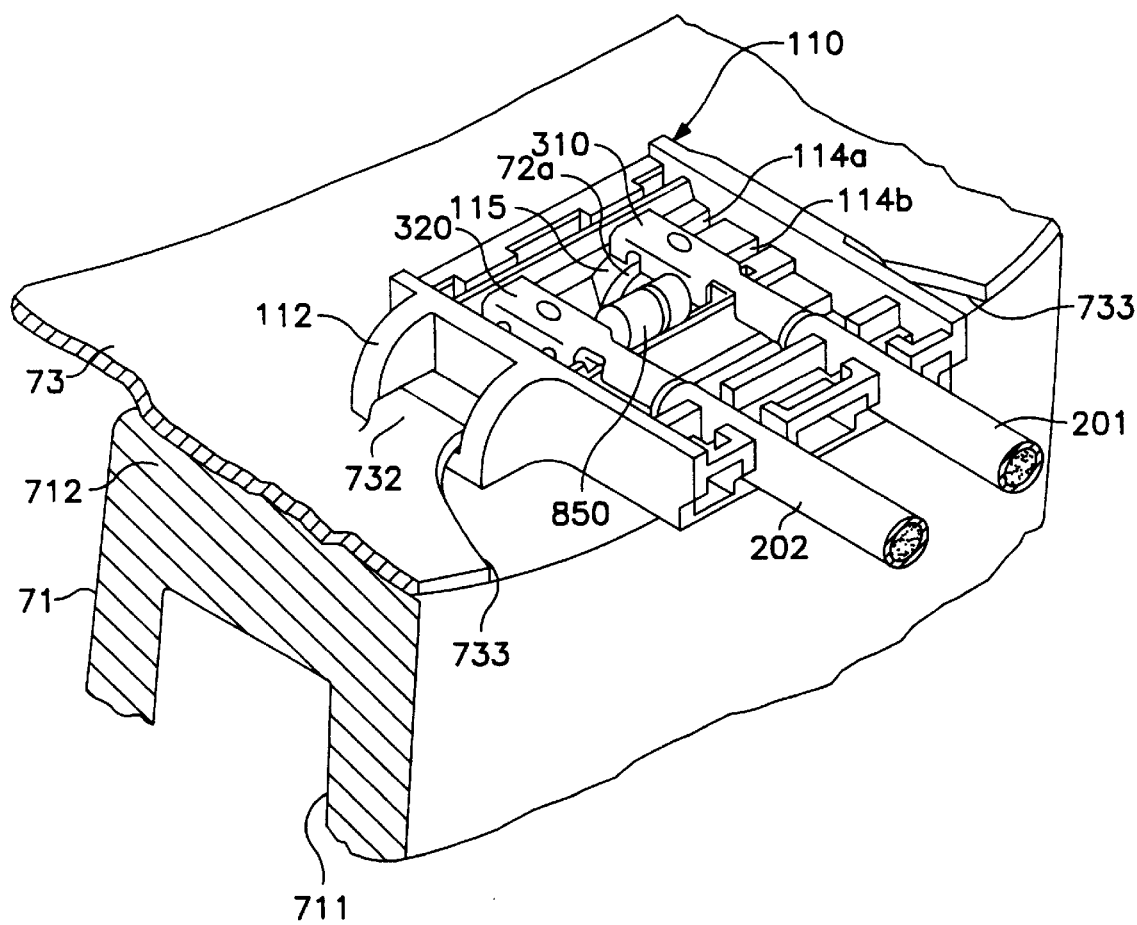

As described above, first and second end portions 72a and 72b of coil 72, and surge voltage eliminating device 850, and the pair of terminals 310 and 320 are disposed within the inner hollow space of box member 110, as illustrated in FIG. 10.

In a ninth step, with reference to FIG. 14, first chamber section 131 defined within the inner hollow space of box member 110 between first and second partitioning walls 117 and 118 is filled with air-setting resin (resin that is set without heating) electrical insulating material, which may be, for example, acrylic resin 119. Therefore, first and second end portions 72a and 72b of coil 72, surge voltage eliminating device 850, and the pair of terminals 310 and 320 are entirely covered with acrylic resin 119. As a result, after acrylic resin 119 is set, the above-mentioned elements are fixedly disposed within first chamber 131 of the inner hollow space of box member 110, and the undesirable intrusion of dust and water droplets into the inner hollow space of box member 110 is prevented. Further, even if an excessive amount of acrylic resin 119 is poured into first chamber section 131, the excess acrylic resin 119 is received by second and third chamber sections 132 and 133, so that a leakage of acrylic resin 119 from box member 110 may be prevented. In a tenth step, as illustrated in FIG. 15c, cover member 120 is secured to box member 110 before acrylic resin 119 in first chamber section 131 is set. A detailed explanation of this step is described below.

As illustrated in FIG. 15a, lid member 120 is oriented such that hooked portion 123a formed at the terminal edge of side wall portion 123 of lid member 120 engaged with a slot 110c formed at one of the pairs of longitudinal side walls 110b (to the left in FIG. 15a) of box member 110. After this operation, a downward force indicated by arrow "F" is applied to lid member 120, so that hooked portion 122a formed at the terminal edge of side wall portion 122 of lid member 120 is moved downwardly, so as to be close to the other longitudinal side wall 110b (to the right in FIG. 15b) of box member 110 as illustrated in FIG. 15b.

By continuously receiving the force "F", hooked portion 122a is moved downwardly along an inner surface of the other longitudinal side wall 110b (to the right in FIG. 15b) of box member 110, and is received within slot 110c formed at the other longitudinal side wall 110b (to the right in FIG. 15c) of box member 110. Thus, lid member 120 is fixedly secured to box member 110, as illustrated in FIG. 15c.

Figure 13F:
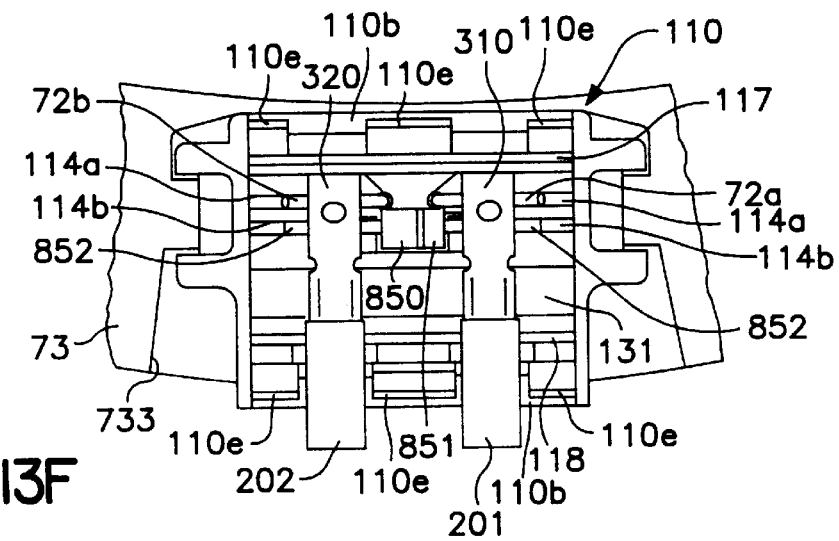

Moreover, with reference to FIGS. 13f and 14, a chamfered portion 110e, partially formed at an upper surface of each of the pair of longitudinal side walls 110b, is provided so that an engaging operation between hooked portions 122a and 123a and slots 110c is effectively assisted.

According to the present invention, the electric engagement between first end portion 72a and terminal 310 is carried only by means of tightly receiving the pair of side wall regions 314 within the corresponding third grooves 114c. Therefore, a well-trained technician is not required to electrically engage first end portion 72a of coil 72 with terminal 310 even though first end portion 72a is fine and tends to be easily bent. Similar advantage is obtained in the engagement between second end portion 72b of coil 72 with terminal 320 and between the pair of lead wires 852 and the corresponding terminals 310 and 320.

In addition, because each of terminals 310 and 320 is prepared via the continuous forming processes, terminals 310 and 320 can be simply and easily manufactured.

Because first and second end portions 72a and 72b of coil 72 are arranged not to be exposed to the outside of electromagnetic clutch 10, first and second end portions 72a and 72b of coil 72 are not damaged by an external force or the environment, or both.

Moreover, no crimping operation is required in the process of manufacturing the electromagnetic clutch 10 other than a situation in which one end of covered lead wires 201 and 202 are connected to the corresponding terminals 310 and 320, so that the time required to manufacture electromagnetic clutch 10 is reduced.

Because terminals 310 and 320 provided at one end of the corresponding covered lead wires 201 and 202 are electrically engaged with first and second end portions 72a and 72b of coil 72 and pair of lead wires 852 after a time when epoxy resin 701 filled within the air gap created between electromagnetic coil 72 and yoke 71 is cooled to the normal temperature, a part of a cover member covering each of lead wires 201 and 202 adjacent to first and second portions 72a and 72b of coil 72 is not deteriorated by the heat generated in a thermosetting process of epoxy resin 701.

This invention has been described in connection with preferred embodiments. These embodiments, however, are merely for example only, and the invention is not restricted thereto. It will be understood by those skilled in the art that variations and modifications may readily be made within the scope of this invention as defined by the appended claims.

I claim:

1. An electromagnetic clutch including;
    an electromagnetic coil assembly which comprises an annular magnetic housing having a U-shaped cross-section and a coil disposed within an inner hollow space of said annular magnetic housing:
    a conductive element connected to an external electric circuit which includes an electric power source: and,
    a connecting element conductively connecting said conductive element with said coil:
    said annular magnetic housing comprising a first annular side wall portion having an outer diameter, a second annular side wall portion having an inner diameter which is greater than said outer diameter of said first annular side wall portion, and an annular bottom portion connecting said first and second annular side wall portions at their one axial ends;
    said coil comprising a wound single conductive wire, which is coated with a film of insulating material and includes a first end portion and a second end portion opposite to said first end portion;
    said connecting element including a box member having an open top end and a closed bottom end opposite to said open top end, said box member secured to said annular bottom portion of said annular magnetic housing while said first and second end portions of said wound single conductive wire penetrate said annular bottom portion of said annular magnetic housing and said closed bottom end of said box member;
    said conductive element including a pair of covered lead wires and a pair of terminals fixedly connected to one end of the pair of said covered lead wires, respectively;
    said box member including a single first groove, a pair of second grooves and a pair of third grooves which are formed at an inner surface of said closed bottom end thereof, said single first groove, the pair of said second grooves and the pair of said third grooves being arranged such that said single first groove intersects with both the pair of said second grooves and the pair of said third grooves; and each of said pair of terminals including a flat top portion having opposite lateral ends, a pair of side portions downwardly projecting from said opposite lateral ends of said flat top portion, respectively, and a pair of first slits formed at a projecting end of said pair of side portions of each of said terminals, respectively;

said first and second portions of said wound single conductive wire being arranged, such that a part of each of said first and second end portions therein is laid on an inner bottom surface of said first groove;

said pair of side portions of said pair of terminals being received within the pair of said second grooves and the pair of said third grooves, respectively, while a part of said first and second end portions of said wound single conductive wire laid on the inner bottom surface of said single first groove is forcibly received within said pair of first slits of said pair of terminals, respectively.

2. The electromagnetic clutch of claim 1, wherein a gap created between said coil and said annular magnetic housing is filled with a first resin, wherein said resin is set by heating so as to cover said coil therewith.

3. The electromagnetic clutch of claim 2, wherein said first resin is electrically insulating.

4. The electromagnetic clutch of claim 3, wherein said first resin is an epoxy resin.

5. The electromagnetic clutch of claim 2, wherein an inner hollow space of said box member is filled with a second resin set without heating so as to cover a part of each of said first and second end portions of said wound single conductive wire laid on the inner bottom surface of said single first groove and said pair of terminals therewith, after said first resin is cooled to a normal temperature.

6. The electromagnetic clutch of claim 5, wherein said second resin is electrically insulating.

7. The electromagnetic clutch of claim 6, wherein said second resin is an acrylic resin.

8. The electromagnetic clutch of claim 5 further including a separate lid member which comprises a pair of side wall portions downwardly extending from a pair of opposite longitudinal ends thereof, respectively, and a pair of hooked portions formed at a projecting end of said pair of side wall portions, respectively;

said box member further including a pair of slots formed at the open top end thereof, oppositely; wherein, said box member and said lid member are fixedly secured to each other by means of engaging said pair of hooked portions with said pair of slots, respectively, before a time when said second resin is set.

9. The electromagnetic clutch of claim 5, said box member further including a first partitioning wall and second partitioning wall, said first and second partitioning walls formed at the inner surface of said closed bottom end thereof so as to divide said inner hollow space thereof into a first, second and third chamber sections;

said first, second and third chamber sections being arranged such that said first, second and third chamber sections are aligned with each other along the longitudinal axis of said box member, and such that said first chamber section is positioned to be sandwiched between said second and third chamber sections;

said first chamber section being arranged such that a part of each of said first and second end portions of said wound single conductive wire laid on the inner bottom surface of said single first groove and said pair of terminals are disposed therein; wherein, said second and third chamber sections are arranged to be able to sufficiently receive a second resin overflow from said first chamber section, even if an excessive amount of the second resin is poured into said first chamber section.

10. The electromagnetic clutch of claim 1, wherein said wound single conductive wire is coated with a film of enamel.

11. The electromagnetic clutch of claim 1, wherein said single first groove, the pair of said second grooves and the pair of said third grooves are arranged such that said single first groove intersects with both the pair of said second grooves and the pair of said third grooves at right angles.

12. The electromagnetic clutch of claim 1, further including a device for eliminating a surge voltage, said surge voltage occurring immediately after a time when operation of the electromagnetic clutch is terminated, said device for eliminating a surge voltage including a diode and a pair of lead wires oppositely extending from each other;

said box member further including a single fourth groove, said single fourth groove being arranged such that said single fourth groove intersects with both the pair of said second grooves and the pair of said third grooves;

said pair of lead wires of said surge voltage eliminating device being arranged to be laid on an inner bottom surface of said fourth groove;

each of said pair of terminals further including a pair of second slits formed at the projecting end of said side portions of each of said terminals, respectively;

said pair of lead wires of said surge voltage eliminating device laid on the inner bottom surface of said fourth groove being forcibly received within said pair of second slits of said pair of terminals, respectively, when said pair of side portions of said pair of terminals are received within the pair of said second grooves and the pair of said third grooves, respectively.

13. The electromagnetic clutch of claim 12, wherein a gap created between said coil and said annular magnetic housing is filled with a first resin set by heating so as to cover said coil therewith.

14. The electromagnetic clutch of claim 13, wherein said first resin is electrically insulating.

15. The electromagnetic clutch of claim 14, wherein said first resin is an epoxy resin.

16. The electromagnetic clutch of claim 13, wherein an inner hollow space of said box member is filled with a second resin set without heating so as to cover a part of each of said single first and second end portions of said wound single conductive wire laid on the inner bottom surface of said single first groove, said pair of lead wires of said surge voltage eliminating device laid on the inner bottom surface of said single fourth groove and said pair of terminals therewith, after said first resin is cooled to a normal temperature.

17. The electromagnetic clutch of claim 16, wherein second resin is electrically insulating.

18. The electromagnetic clutch of claim 17, wherein said second resin is an acrylic resin.

19. The electromagnetic clutch of claim 16 further including a separate lid member which comprises a pair of side wall portions downwardly extending from a pair of opposite longitudinal ends thereof, respectively, and a pair of hooked portions formed at a projecting end of said pair of side wall portions, respectively;

said box member further including a pair of slots formed at the open top end thereof, oppositely; wherein, said box member and said lid member are fixedly secured to each other by means of engaging said pair of hooked portions with said pair of slots, respectively, before a time when said second resin is set.

20. The electromagnetic clutch of claim 16, said box member further including a first partitioning wall and a second partitioning wall, said first and second partitioning walls formed at the inner surface of said closed bottom end thereof so as to divide said inner hollow space thereof into a first, second and third chamber sections;

said first, second and third chamber sections being arranged such that said first, second and third chamber sections are aligned with each other along the longitudinal axis of said box member, and such that said first chamber section is positioned to be sandwiched between said second and third chamber sections;

said first chamber section being arranged such that a part of each of said first and second end portions of said wound single conductive wire laid on the inner bottom surface of said single first groove, said pair of lead wires of said surge voltage eliminating device laid on the inner bottom surface of said single fourth groove and said pair of terminals are disposed therewithin; wherein said second and third chamber sections are arranged to sufficiently receive a second resin overflow from said first chamber section, even if an excessive amount of the second resin is poured into said first chamber section.

21. The electromagnetic clutch of claim 20, wherein said wound single conductive wire is coated with a flim of enamel.

22. The electromagnetic clutch of claim 20, wherein said single first groove, the pair of said second grooves, the pair of said third grooves and said single fourth groove are arranged such that said single first and fourth grooves are parallel to each other, and such that said single first and fourth grooves intersect with both the pair of said second grooves and the pair of said third grooves at right angles.

* * * * *